US012749986B2

(12) United States Patent
Zhu et al.

(10) Patent No.: US 12,749,986 B2
(45) Date of Patent: Sep. 29, 2026

(54) ISOLATED POWER SUPPLY, CONTROL CIRCUIT AND METHOD THEREOF

(71) Applicant: SHANGHAI BRIGHT POWER SEMICONDUCTOR CO., LTD., Shanghai (CN)

(72) Inventors: Jianpei Zhu, Shanghai (CN); Yue Zheng, Shanghai (CN); Yucai Yang, Shanghai (CN); Zhen Zhu, Shanghai (CN); Yanmei Guo, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 212 days.

(21) Appl. No.: 18/754,872

(22) Filed: Jun. 26, 2024

(65) Prior Publication Data

US 2025/0007418 A1 Jan. 2, 2025

(30) Foreign Application Priority Data

Jun. 29, 2023 (CN) ......................... 202310787695.1

(51) Int. Cl.
*H02M 3/335* (2006.01)
*H02M 1/00* (2007.01)

(52) U.S. Cl.
CPC ..... *H02M 3/33592* (2013.01); *H02M 1/0009* (2021.05); *H02M 3/33523* (2013.01)

(58) Field of Classification Search
CPC .. H02M 1/0009; H02M 1/0058; H02M 1/083; H02M 3/33592; H02M 3/33523; H02M 3/507
See application file for complete search history.

(56) References Cited

U.S. PATENT DOCUMENTS

| | | | | |
|---|---|---|---|---|
| 11,929,684 B2* | 3/2024 | Guo | H02M 3/33592 |
| 12,155,316 B2* | 11/2024 | Guo | H02M 1/0048 |
| 2019/0149032 A1* | 5/2019 | Yang | H02M 1/083 363/21.14 |
| 2020/0169179 A1* | 5/2020 | Hara | H02M 1/38 |
| 2025/0202376 A1* | 6/2025 | Yang | H02M 3/33523 |
| 2025/0364914 A1* | 11/2025 | Gong | H02M 3/33592 |

* cited by examiner

*Primary Examiner* — Sisay G Tiku
(74) *Attorney, Agent, or Firm* — MUNCY, GEISSLER, OLDS & LOWE, P.C.

(57) ABSTRACT

A control circuit of an isolated power supply, an isolated power supply and a control method thereof are disclosed. The control circuit includes a primary original signal generator generating a primary original turn-on signal based on a voltage feedback signal of an output voltage of the isolated power supply, and a secondary control signal generator generating a secondary control signal based on a secondary voltage signal and the primary original turn-on signal. In a current switching period, only when an expected turn-on instant for a primary main transistor switch is earlier than an expected turn-on instant for a secondary synchronous rectifier, will the secondary control signal provide an indication to turn on the secondary synchronous rectifier.

18 Claims, 5 Drawing Sheets

ISOLATED POWER SUPPLY, CONTROL CIRCUIT AND METHOD THEREOF

CROSS-REFERENCE TO RELATED APPLICATION

This application claims the priority of Chinese patent application number 202310787695.1, filed on Jun. 29, 2023 and entitled "ISOLATED POWER SUPPLY AND CONTROL CIRCUIT AND METHOD THEREOF", the entire contents of which are incorporated herein by reference.

TECHNICAL FIELD

The present disclosure relates to the field of electronic circuits and, in particular, to an isolated power supply and a control circuit and method of the isolated power supply.

BACKGROUND

In the contemporary context of more and more importance being attached to environmental protection and energy conservation, there is an ever-increasing demand for more efficient power supplies. For switched-mode power supplies, replacing the traditional freewheeling diode with a synchronous rectifier is an effective way to obtain increased efficiency. When the power supply operates in a continuous conduction mode (CCM), during control of the synchronous rectifier, in case of the synchronous rectifier conducts simultaneously with a primary main transistor switch, it may create a serious risk of breakdown, thereby, special care is needed during design of a control circuit. For non-isolated switched-mode power supplies, control of the synchronous rectifier may be simultaneous with control of a primary main transistor switch, and the design is not challenging. However, for isolated switched-mode power supplies, as the synchronous rectifier and an associated control circuit are arranged on the secondary side and electrically isolated from the primary main transistor switch and an associated control circuit which are arranged on the primary side, making control more challenging.

The primary and secondary sides of conventional isolated power supplies are usually controlled separately. That is, the secondary synchronous rectifier is generally turned on and off independently of control logic of the primary main transistor switch. Typically, a voltage on the secondary winding is detected and used to determine whether the primary main transistor switch has been turned on, and if so, the secondary synchronous rectifier is turned off. Although this approach is highly transportable and does need to take into account coordination with the primary controller, it is associated with a main disadvantage: poor reliability. Due to leakage inductance or some other reason during operation in a discontinuous conduction mode (DCM), there may be a probability of false turn-on as a consequence of falsely taking resonance of the inductor as a turn-on signal, this may degrade the conversion efficiency. Further, during CCM operation, since turn-off of the secondary synchronous rectifier always lags behind turn-on of the primary main transistor switch, there leaves a chance for simultaneous conduction to occur in the event of a load or input voltage change. When this happens, limiting a current generated during simultaneous conduction has to be relied on to prevent breakdown, which, however, may lead to an additional degradation in efficiency.

Therefore, in the field of isolated power supplies, there is an urgent need for a control method, which can address the problem of simultaneous conduction of the primary main transistor switch and the secondary synchronous rectifier in a reliable style without compromising efficiency.

SUMMARY OF THE INVENTION

It is an object of the present disclosure to provide an isolated power supply and a control circuit and control method thereof, which overcome the prior-art problem that simultaneous conduction of the main transistor switch and the synchronous rectifier is prevented at the cost of compromised efficiency.

To this end, the present disclosure provides a control circuit of an isolated power supply, which comprises:

a primary original signal generator configured to receive a voltage feedback signal of an output voltage of the isolated power supply to generate a primary original turn-on signal, wherein the primary original turn-on signal contains information about an expected turn-on instant for a primary main transistor switch in the isolated power supply; and a secondary control signal generator configured to receive a secondary voltage signal from a secondary winding in the isolated power supply and the primary original turn-on signal to obtain: information about an expected turn-on instant for a secondary synchronous rectifier in the isolated power supply; a freewheeling time of a body diode in the secondary synchronous rectifier; and a dead time, thereby generating a secondary control signal, wherein in a current switching period, if the expected turn-on instant for the primary main transistor switch is earlier than the expected turn-on instant for the secondary synchronous rectifier, the secondary control signal provides an indication to turn on the secondary synchronous rectifier; or if a value of the secondary voltage signal is higher than a turn-off threshold for the current switching period, the secondary control signal provides an indication to turn off the secondary synchronous rectifier; and wherein the secondary control signal generator further adjusts the turn-off threshold for a next switching period based on the freewheeling time and the dead time of the current switching period, so that the freewheeling time gets closer to a freewheeling reference value and the dead time gets closer to a dead reference value.

Optionally, the secondary control signal generator may further derive a secondary turn-off signal from the secondary control signal, wherein secondary control signal contains information about an actual turn-off instant for the secondary synchronous rectifier, wherein the control circuit further comprises:

a logic controller configured to receive the primary original turn-on signal and the secondary turn-off signal to generate a primary turn-on signal which contains information about an actual turn-on instant for the primary main transistor switch and indicates that the actual turn-on instant for the primary main transistor switch is not earlier than the actual turn-off instant for the secondary synchronous rectifier in the current switching period.

Optionally, in the current switching period, if the expected turn-on instant for the primary main transistor switch is later than the actual turn-off instant for the secondary synchronous rectifier, the primary turn-on signal may provide an indication to turn on the primary main transistor switch at the expected turn-on instant for the primary main transistor switch, or if the expected turn-on instant for the primary main transistor switch is earlier than the actual turn-off instant for the secondary synchronous rectifier, the primary turn-on signal may provide an indication to turn on the primary main transistor switch at or after the actual turn-off instant for the secondary synchronous rectifier.

Optionally, the control circuit may further comprise:

a signal transmitter configured to receive and modulate the primary original turn-on signal or the primary turn-on signal, and to transmit the modulated primary original turn-on signal or primary turn-on signal from the secondary side to the primary side.

Optionally, the expected turn-on instant for the secondary synchronous rectifier may be an instant at which a value of the secondary voltage signal drops below a turn-on threshold for the first time. Alternatively, the expected turn-on instant for the secondary synchronous rectifier may be an instant at which a slope of the secondary voltage signal rises above a turn-on slope threshold for the first time.

Optionally, the secondary control signal generator may comprise:

a time detector for configured to receive the secondary voltage signal and the primary original turn-on signal, and to detect the freewheeling time and the dead time of the current switching period;

a threshold generator configured to receive the freewheeling time and the dead time of the current switching period, and to output the turn-off threshold for the next switching period based on: a comparison of the freewheeling time with a freewheeling reference value; and a comparison of the dead time with a dead reference value; and a control signal generator configured to receive the primary original turn-on signal, the secondary voltage signal and the turn-off threshold for the current switching period, thereby generating the secondary control signal.

Optionally, if the freewheeling time of the current switching period is less than the freewheeling reference value or the dead time of the current switching period is less than the dead reference value, the turn-off threshold for the next switching period generated by the threshold generator may be lower than the turn-off threshold for the current switching period, or if the freewheeling time of the current switching period is greater than the freewheeling reference value and the dead time of the current switching period is greater than the dead reference value, the turn-off threshold for the next switching period generated by the threshold generator may be higher than the turn-off threshold for the current switching period.

The present disclosure also provides an isolated power supply comprising an isolated converter comprising a primary side and a secondary side, the primary side comprising a primary main transistor switch, the secondary side comprising a secondary synchronous rectifier; and the control circuit as defined above for controlling turn-on and turn-off of the secondary synchronous rectifier.

Optionally, the isolated converter may be a flyback isolated converter.

Optionally, the control circuit may be arranged on the secondary side, wherein the isolated power supply further comprises a primary controller arranged on the primary side, the primary controller configured to receive a signal from the control circuit to control turn-on and turn-off of the primary main transistor switch.

The present disclosure also provides a control method for an isolated power supply, which comprises:

receiving a voltage feedback signal of an output voltage of the isolated power supply to generate a primary original turn-on signal, wherein the primary original turn-on signal contains information about an expected turn-on instant for a primary main transistor switch in the isolated power supply; and receiving a secondary voltage signal from a secondary winding in the isolated power supply and the primary original turn-on signal to obtain: information about an expected turn-on instant for a secondary synchronous rectifier in the isolated power supply; a freewheeling time of a body diode in the secondary synchronous rectifier; and a dead time, thereby generating a secondary control signal, wherein in a current switching period, if the expected turn-on instant for the primary main transistor switch is earlier than the expected turn-on instant for the secondary synchronous rectifier, the secondary control signal provides an indication to turn on the secondary synchronous rectifier; or if a value of the secondary voltage signal is higher than a turn-off threshold for the current switching period, the secondary control signal provides an indication to turn off the secondary synchronous rectifier; and wherein the turn-off threshold for the next switching period is adjusted by a secondary control signal generator based on the freewheeling time and dead time of the current switching period, so that the freewheeling time gets closer to a freewheeling reference value and the dead time gets closer to a dead reference value.

Optionally, the adjustment of the turn-off threshold for the next switching period based on the freewheeling time and dead time of the current switching period may comprise the steps of:

comparing the freewheeling time of the current switching period with the freewheeling reference value, and comparing the dead time of the current switching period with the dead reference value; and if the freewheeling time of the current switching period is less than the freewheeling reference value or the dead time of the current switching period is less than the dead reference value, reducing the turn-off threshold for the next switching period, or if the freewheeling time of the current switching period is greater than the freewheeling reference value and the dead time of the current switching period is greater than the dead reference value, increasing the turn-off threshold for the next switching period.

The present disclosure provides a control circuit of an isolated power supply, which includes a primary original signal generator and a secondary control signal generator. The primary original signal generator is configured to receive a voltage feedback signal of an output voltage of the isolated power supply to generate a primary original turn-on signal which contains information about an expected turn-on instant for a primary main transistor switch. The secondary control signal generator is configured to receive a secondary voltage signal from a secondary winding and the primary original turn-on signal to generate a secondary control signal. In a current switching period, only when the expected turn-on instant for the primary main transistor switch is earlier than an expected turn-on instant for a secondary synchronous rectifier, will the secondary control signal provide an indication to turn on the secondary synchronous rectifier, thereby overcoming the problem of possible false turn-on of the secondary synchronous rectifier SR in DCM operation and eliminating the possibility of shoot-through. Moreover, the secondary control signal generator is also configured to adjust a turn-off threshold for the next switching period based on freewheeling time and dead time of the current switching period, so that the freewheeling time and the dead time get closer to a freewheeling reference value and a dead reference value, respectively. Further, only when a value of the secondary voltage signal is higher than the turn-off threshold for the current switching period, will the secondary control signal provide an indication to turn off the secondary synchronous rectifier. This enables the secondary synchronous rectifier to be turned off at an almost zero current in a steady state, achieving reduced switching loss and higher efficiency. The present disclosure also provides a corresponding isolated power supply and a corresponding control method.

LIST OF REFERENCE NUMERALS

100—isolated power supply; 101—control circuit; 102—secondary control signal generator; 112—time detector; 122—threshold generator; 1221—first comparator; 1222—second comparator; 1223—NOR gate; 1224—threshold adjuster; 132—control signal generator; 142—turn-off signal generator; 103—primary original signal generator; 104—logic controller; 105—signal transmitter; 106—signal sensor; 107—load; 108—primary controller;

RB—rectifier bridge; Cin—input capacitor; CR—snubber circuit; T1—isolation transformer; P1—primary winding; Q1—primary main transistor switch; AC—external AC—power supply; S1—secondary winding; SR—secondary synchronous rectifier; Cout—output filtering capacitor; VFB—voltage feedback signal; PSO—primary original turn-on signal; V_Forw—secondary voltage signal; K1—expected turn-on instant for primary main transistor switch; SRoff—secondary turn-off signal; K1'—actual turn-on instant for secondary synchronous rectifier; K2—actual turn-off instant for secondary synchronous rectifier; Tbd—freewheeling time; Tdead—dead time; Von—turn-on threshold; Voff, turn-off threshold; K3—instant at which secondary voltage signal rises above 0 V for first time; Tbd_min—freewheeling reference value; Tdead_min—dead reference value; COMP1—first comparison signal; COMP2—second comparison signal; Voff_ctrl, threshold control signal; SRG—secondary control signal; PSC, primary turn-on signal; PSG, primary control signal; Ip—primary current; Is—secondary current.

DETAILED DESCRIPTION

Specific embodiments of the present disclosure will be described in greater detail below with reference to the accompanying drawings. From the following description, advantages and features of the disclosure will become apparent. Note that the figures are provided in a very simplified form not necessarily drawn to exact scale for the only purpose of helping to explain the disclosed embodiments in a more convenient and clearer way.

Embodiment 1

Figure 1:
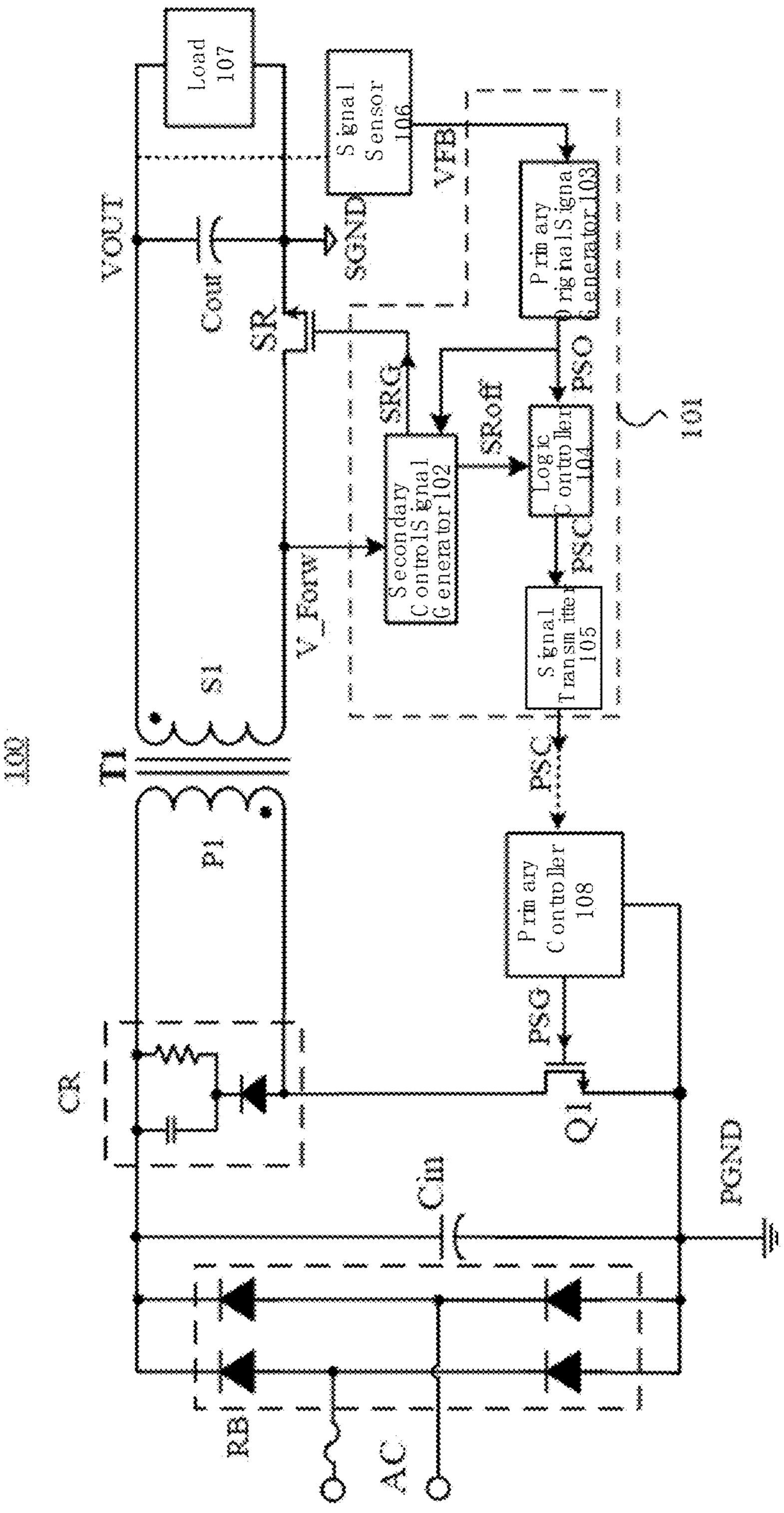
FIG. 1 is a schematic diagram showing the structure of an isolated power supply according to a first embodiment of the present disclosure.

FIG. 1 is a schematic diagram showing the structure of an isolated power supply 100 according to a first embodiment of the present disclosure. As shown in FIG. 1, a control circuit 101 is also provided in Embodiment 1, in addition to the isolated power supply 100. The isolated power supply system adopts a flyback power supply topology including a primary side and a secondary side. The primary side includes a rectifier bridge RB, an input capacitor Cin, a snubber circuit CR, a primary winding P1 of an isolation transformer T1 and a primary main transistor switch Q1. An input terminal of the rectifier bridge RB is coupled to an external AC power supply AC. The secondary side includes a secondary winding S1 of the isolation transformer T1, a secondary synchronous rectifier SR, the control circuit 101, an output filtering capacitor Cout and a load 107. The topology of such a flyback isolated power supply is well known to those skilled in the art and therefore does not need to be described in further detail herein.

The control circuit 101 for the isolated power supply will be described in detail below in the exemplary context of the flyback topology shown in FIG. 1. It is noted that, although FIG. 1 shows the use of the control circuit 101 of Embodiment 1 in an isolated power supply system which is the flyback topology, the present disclosure is not so limited, because it may also be suitably used in any other isolated power supply topology associated with a risk of simultaneous conduction of a primary main transistor switch and a secondary synchronous rectifier, such as for example, single-ended forward, dual-switch forward, active clamp forward, resonant half-bridge LLC, resonant full-bridge LLC, phase-shifted full-bridge, etc., as would be appreciated by those of ordinary skill in the art.

As shown in FIG. 1, the control circuit 101 includes a primary original signal generator 103 and a secondary control signal generator 102.

The primary original signal generator 103 is configured to receive a voltage feedback signal VFB of an output voltage VOUT of the isolated power supply to generate a primary original turn-on signal PSO which contains at least information about an expected turn-on instant K1 for the primary main transistor switch Q1 and provides an indication to turn on the primary main transistor switch Q1. In some embodiments, the primary original signal generator 103 may compare the voltage feedback signal VFB with a reference voltage, generate the primary original turn-on signal PSO if the voltage feedback signal VFB drops to the reference voltage, and take an instant at which the voltage feedback signal VFB drops to the reference voltage as the expected turn-on instant K1 for the primary main transistor switch Q1.

The secondary control signal generator 102 is configured to receive a secondary voltage signal V_Forw from the secondary winding S1 and the primary original turn-on signal PSO to generate a secondary control signal SRG based on the secondary voltage signal V_Forw and the primary original turn-on signal PSO. The secondary control signal SRG contains information about an actual turn-on instant K1' or an actual turn-off instant K2 for the secondary synchronous rectifier SR and provides an indication to turn on or off the secondary synchronous rectifier SR.

Specifically, after receiving the secondary voltage signal V_Forw and the primary original turn-on signal PSO, the secondary control signal generator 102 may obtain, from these signals, information about an expected turn-on instant for the secondary synchronous rectifier SR, a freewheeling time Tbd of a body diode in the secondary synchronous rectifier SR and a dead time Tdead.

In Embodiment 1, the expected turn-on instant for the secondary synchronous rectifier SR is an instant at which a value of the secondary voltage signal V_Forw drops below a turn-on threshold Von for the first time. The turn-on threshold Von may be, for example, a negative value such as −0.8 V. In some embodiments, the expected turn-on instant K4 for the secondary synchronous rectifier SR may be alternatively an instant at which a slope of the secondary voltage signal V_Forw rises above a turn-on slope threshold for the first time.

The freewheeling time Tbd of the body diode in the secondary synchronous rectifier SR is defined as a period of time from the actual turn-off instant K2 for the secondary synchronous rectifier SR to an instant K3 at which the value of the secondary voltage signal V_Forw rises above 0 V for the first time. The dead time Tdead is defined as a period of time from the actual turn-off instant K2 for the secondary synchronous rectifier SR to the expected turn-on instant K1 for the primary main transistor switch Q1.

It should be understood that, as used herein, the term "expected turn-on instant K1 for the primary main transistor switch Q1" is intended to refer to an instant of time at which the primary main transistor switch Q1 is expected to be turned on, which is determined according to only the design principles of a feedback control loop in the isolated power supply from the voltage feedback signal VFB and other possible feedback parameters (e.g., a current feedback signal of an output current from the isolated power supply), as well as from an internal clock signal and/or a feedback loop compensation. The "expected turn-on instant K1 for the primary main transistor switch Q1" may be determined directly from the information on the expected turn-on instant K1 which is contained in a generated signal, or by performing a certain operation on instant information contained in a given signal, which adds or subtracts a time bias, for example. The term "voltage on the secondary winding S1" refers to a voltage present at a variable potential terminal of the secondary winding S1, that is, a voltage at a terminal connected by both the secondary synchronous rectifier SR and the secondary winding S1. The term "secondary voltage signal V_Forw from the secondary winding S1" refers to a signal characterizing the voltage on the secondary winding S1, which is, for example, a signal resulting from the voltage on the secondary winding S1 through a voltage divider, or a signal directly sampled at the variable potential terminal of the secondary winding S1. In the embodiment shown in FIG. 1, the secondary synchronous rectifier SR is connected between the secondary winding S1 and a secondary ground SGND, and the output voltage VOUT is directly provided at an in-phase terminal of the secondary winding S1. As the output voltage VOUT remains constant in steady-state, the in-phase terminal is a fixed potential terminal. An out-of-phase terminal of the secondary winding S1 is connected to the secondary synchronous rectifier SR, and the voltage on the secondary winding S1 is obtained as a voltage present at the out-of-phase terminal. In other embodiments, the secondary synchronous rectifier SR may be alternatively connected between the secondary winding S1 of FIG. 1 and an output terminal of the isolated power supply. In this case, the voltage on the secondary winding S1 is instead obtained as a voltage present at the in-phase terminal.

It should be understood that the expected turn-on instant K1 for the primary main transistor switch Q1, the expected turn-on instant for the secondary synchronous rectifier SR, the actual turn-on instant K1' for the secondary synchronous rectifier SR and the actual turn-off instant K2 for the secondary synchronous rectifier SR are defined for each switching period. That is, multiple such expected turn-on instants K1 for the primary main transistor switch Q1, multiple such expected turn-on instants for the secondary synchronous rectifier SR, multiple such actual turn-on instants K1' for the secondary synchronous rectifier SR and multiple such actual turn-off instants K2 for the secondary synchronous rectifier SR are defined in multiple switching periods. Correspondingly, the freewheeling time Tbd and the dead time Tdead are also defined for each switching period, and multiple freewheeling times Tbd and dead times Tdead are defined in multiple switching periods.

In a current switching period, only when the expected turn-on instant K1 for the primary main transistor switch Q1 is earlier than the expected turn-on instant for the secondary synchronous rectifier SR, will the secondary synchronous rectifier SR be turned on (i.e., the secondary synchronous rectifier SR is turned on only when turn-on of the primary main transistor switch Q1 has occurred). This can avoid the secondary synchronous rectifier SR from being falsely turned on when a resonant component in the voltage on the secondary winding S1 satisfies a predefined turn-on condition for the secondary synchronous rectifier SR in a discontinuous conduction mode (DCM), eliminating the possibility of shoot-through.

Further, in a current switching period, if the secondary voltage signal V_Forw is higher than a turn-off threshold Voff_n for the current switching period, the secondary control signal SRG provides an indication to turn off the synchronous rectifier SR. In this way, the secondary synchronous rectifier SR can be turned off without needing to detect whether the primary main transistor switch Q1 is on or not. Thus, the secondary control signal generator 102 can substantially ensure that simultaneous conduction of the secondary synchronous rectifier SR and the primary main transistor switch Q1 is avoided in steady-state operation, even without any additional anti-shoot-through or anti-breakdown design. Moreover, based on the freewheeling time Tbd_n and the dead time Tdead_n for the current switching period, the secondary control signal generator 102 adjusts the turn-off threshold Voff_n+1 for the next switching period so that the freewheeling time and the dead time get closer to a freewheeling reference value Tbd_min and a dead reference value Tdead_min, respectively. This enables the secondary synchronous rectifier SR to be turned off at an almost zero current in steady-state, avoiding oscillation caused by continued conduction of the secondary synchronous rectifier SR after zero-crossing. As such, reduced switching loss and higher efficiency can be achieved.

Figure 2:
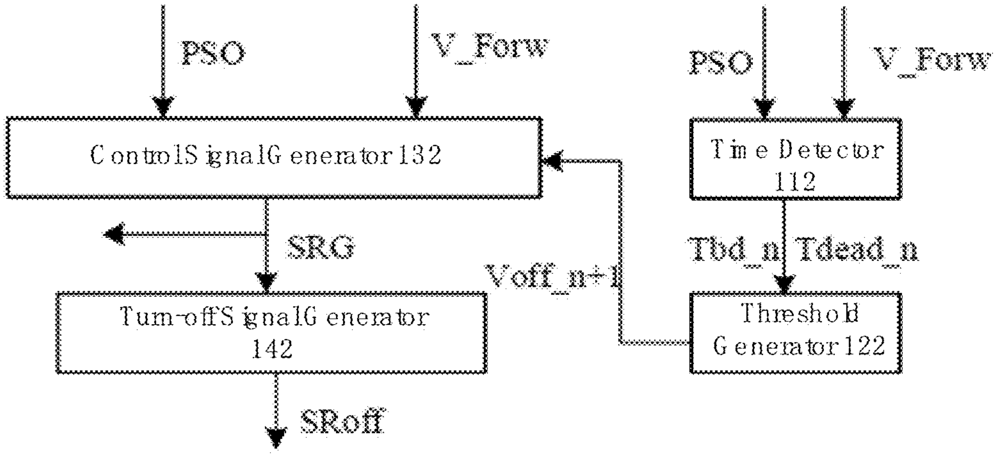
FIG. 2 is a block diagram of the structure of a specific implementation of a secondary control signal generator according to the first embodiment of the present disclosure.

FIG. 2 is a block diagram of the structure of a specific implementation of the secondary control signal generator 102 Embodiment 1. As shown in FIG. 2, the secondary control signal generator 102 includes a time detector 112, a threshold generator 122, a control signal generator 132 and a turn-off signal generator 142.

The time detector 112 is configured to receive the secondary voltage signal V_Forw and the primary original turn-on signal PSO and detect the freewheeling time Tbd_n and the dead time Tdead_n for the current switching period. In the art, there are available designs which can detect the freewheeling time and dead time, for example, by monitoring variation of the control signal or drive signal for the transistor switches, or variation of the winding voltages, and are omitted herein. Those skilled in the art will appreciate that any suitable method capable of detecting the freewheeling time and dead time can be suitably used in Embodiment 1 to achieve the above goal.

The threshold generator 122 is configured to receive the freewheeling time Tbd_n and the dead time Tdead_n for the current switching period and outputs the turn-off threshold Voff_n+1 for the next switching period based on a comparison of the freewheeling time Tbd_n with the freewheeling reference value Tbd_min and a comparison of the dead time Tdead_n with the dead reference value Tdead_min.

The freewheeling reference value Tbd_min and the dead reference value Tdead_min may be 100 ns, for example. In a non-limiting example, an initial value of the turn-off threshold may be set to −0.2 V.

Specifically, if the freewheeling time Tbd_n for the current switching period is less than the freewheeling reference value Tbd_min, it is indicated that demagnetization of the secondary winding will be completed, and the freewheeling time is very short, a current inversion would occur if the secondary synchronous rectifier SR were turned off at a slightly later time. If the dead time Tdead_n for the current switching period is less than the dead reference value Tdead_min, it is indicated that the turn-off instant of the secondary synchronous rectifier SR has an impact on the control of the primary original turn-on signal PSO over the primary main transistor switch Q1, necessitating turning off the secondary synchronous rectifier SR at an earlier time. That is, in both these cases, it would be desirable to turn off the secondary synchronous rectifier SR at an earlier time. Accordingly, if the freewheeling time Tbd_n for the current switching period is less than the freewheeling reference value Tbd_min, or if the dead time Tdead_n for the current switching period is less than the dead reference value Tdead_min, the turn-off threshold Voff_n+1 for the next switching period is lower than the turn-off threshold Voff_n for the current switching period, that is, the turn-off threshold Voff_n+1 for the next switching period is reduced to allow the secondary synchronous rectifier SR to be turned off at an earlier time.

On the contrary, if the freewheeling time Tbd_n for the current switching period is greater than the freewheeling reference value Tbd_min and if the dead time Tdead_n for the current switching period is greater than the dead reference value Tdead_min, it is indicated that the turn-off instant of the secondary synchronous rectifier SR does not have an impact on the control of the primary original turn-on signal PSO over the primary main transistor switch Q1 and the freewheeling time is long enough, the turn-off threshold Voff_n+1 for the next switching period is higher than the turn-off threshold Voff_n for the current switching period, that is, the turn-off threshold Voff_n+1 for the next switching period is increased to allow the secondary synchronous rectifier SR to be turned off at a later time to increase the efficiency.

Figure 3:
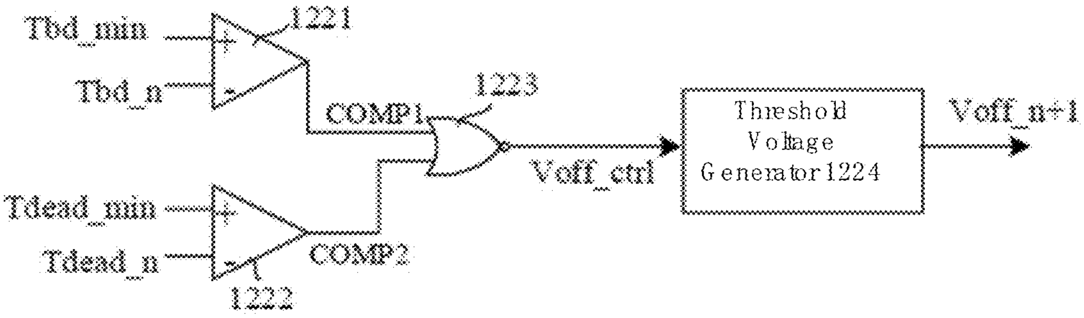
FIG. 3 is a block diagram of the structure of a possible specific implementation of a threshold generator according to the first embodiment of the present disclosure.

FIG. 3 is a block diagram of the structure of a possible specific implementation of the threshold generator 122 Embodiment 1. As shown in FIG. 3, the threshold generator 122 includes a first comparator 1221, a second comparator 1222, a NOR gate 1223 and a threshold adjuster 1224.

Specifically, a negative input terminal of the first comparator 1221 is configured to receive the freewheeling time Tbd_n for the current switching period, and a positive input terminal of the first comparator 1221 is configured to receive the freewheeling reference value Tbd_min. The first comparator 1221 compares the freewheeling time Tbd_n for the current switching period with the freewheeling reference value Tbd_min and generates a first comparison signal COMP1 which contains information about the comparison made between the freewheeling time Tbd_n for the current switching period and the freewheeling reference value Tbd-_min. A negative input terminal of the second comparator 1222 is configured to receive the dead time Tdead_n for the current switching period, and a positive input terminal of the second comparator 1222 is configured to receive the dead reference value Tdead_min. The second comparator 1222 compares the dead time Tdead_n for the current switching period with the dead reference value Tdead_min and generates a second comparison signal COMP2 which contains information about the comparison made between the dead time Tdead_n for the current switching period and the dead reference value Tdead_min.

A first input terminal of the NOR gate 1223 is configured to receive the first comparison signal COMP1, and a second input terminal thereof is configured to receive the second comparison signal COMP2. The NOR gate 1223 performs a logical NOR operation on the first comparison signal COMP1 and the second comparison signal COMP2 and generates a threshold control signal Voff_ctrl.

An input terminal of the threshold adjuster 1224 is configured to receive the threshold control signal Voff_ctrl, and the threshold adjuster 1224 is configured to adjust, based on the threshold control signal Voff_ctrl, the turn-off threshold Voff_n for the current switching period into the turn-off threshold Voff_n+1 for the next switching period. Specifically, the turn-off threshold Voff_n for the current switching period may be stored in the threshold adjuster 1224. If the freewheeling time Tbd_n for the current switching period is less than the freewheeling reference value Tdead_min, or if the dead time Tdead_n for the current switching period is less than the dead reference value Tdead_min, the threshold control signal Voff_ctrl, may provide an indication to reduce the turn-off threshold Voff_n, and the threshold adjuster 1224 may reduce the turn-off threshold Voff_n according to this indication provided by the threshold control signal Voff_ctrl and output the reduced turn-off threshold Voff_n as the turn-off threshold Voff_n+1 for the next switching period. If the freewheeling time Tbd_n for the current switching period is greater than the freewheeling reference value Tdead_min and the dead time Tdead_n for the current switching period is greater than the dead reference value Tdead_min, the threshold control signal Voff_ctrl may provide an indication to increase the turn-off threshold Voff_n, and the threshold adjuster 1224 may increase the turn-off threshold Voff_n according to this indication provided by the threshold control signal Voff_ctrl and output the increased turn-off threshold Voff_n as the turn-off threshold Voff_n+1 for the next switching period.

Additionally, the control signal generator 132 is configured to receive the primary original turn-on signal PSO, the secondary voltage signal V_Forw and the turn-off threshold Voff_n for the current switching period to generate the secondary control signal SRG for controlling turn-on and turn-off of the secondary synchronous rectifier SR.

Next, the turn-off signal generator 142 receives the secondary control signal SRG and generates a secondary turn-off signal SRoff which contains information about the actual turn-off instant K2 for the secondary synchronous rectifier SR. For example, the turn-off signal generator 142 may generate the secondary turn-off signal SRoff by sampling a falling edge of the secondary control signal SRG.

The secondary turn-off signal SRoff may be generated after the secondary control signal SRG. The actual turn-on instant K1' and actual turn-off instant K2 for the secondary synchronous rectifier SR indicated in the secondary control signal SRG are theoretic turn-on instant and theoretic turn-off instant which may be slightly earlier than true turn-on and turn-off instants of the secondary synchronous rectifier SR respectively. However, regardless of how the secondary turn-off signal SRoff is related to the secondary control signal SRG, the purpose of the disclosure can be achieved as long as the secondary control signal SRG contains the information on the actual turn-on instant K1' and actual turn-off instant K2 for the secondary synchronous rectifier SR.

In some embodiments, the secondary turn-off signal SRoff may not be generated directly or indirectly from the secondary control signal SRG. Instead, both the secondary turn-off signal SRoff and the secondary control signal SRG may be derived from a common source signal which contains information on the actual turn-on instant K1' and actual turn-off instant K2 for the secondary synchronous rectifier SR, or all the parameters required to calculate the actual turn-on instant K1' and actual turn-off instant K2 for the secondary synchronous rectifier SR.

In some other embodiments, the secondary control signal SRG may be directly taken as a drive signal for the secondary synchronous rectifier SR, which can act on a gate of the secondary synchronous rectifier SR to turn it on or off.

With continued reference to FIG. 1, the control circuit 101 further includes a logic controller 104 configured to receive the secondary turn-off signal SRoff and the primary original turn-on signal PSO to generate a primary turn-on signal PSC which contains at least an actual turn-on instant for the primary main transistor switch Q1 and provides an indication to turn on the primary main transistor switch Q1. Specifically, the logic controller 104 may determine the actual turn-off instant K2 for the secondary synchronous rectifier SR based on the secondary turn-off signal SRoff. Moreover, it may determine the expected turn-on instant K1 for the primary main transistor switch Q1 based on the primary original turn-on signal PSO. Further, it may determine the actual turn-on instant for the primary main transistor switch Q1 based on the expected turn-on instant K1 for the primary main transistor switch Q1 and the actual turn-off instant K2 for the secondary synchronous rectifier SR, thereby generating the primary turn-on signal PSC that provides an indication that the actual turn-on instant for the primary main transistor switch Q1 is not earlier than the actual turn-off instant K2 for the secondary synchronous rectifier SR in the current switching period.

Further, in the current switching period, if the expected turn-on instant K1 for the primary main transistor switch Q1 is later than the actual turn-off instant K2 for the secondary synchronous rectifier SR, the primary turn-on signal PSC may provide an indication to turn on the primary main transistor switch Q1 at the expected turn-on instant K1 for the primary main transistor switch Q1, to take the expected turn-on instant K1 as the actual turn-on instant for the primary main transistor switch Q1. If the expected turn-on instant K1 for the primary main transistor switch Q1 is earlier than the actual turn-off instant K2 for the secondary synchronous rectifier SR, the primary turn-on signal PSC may provide an indication to turn on the primary main transistor switch Q1 at or after the actual turn-off instant K2 for the secondary synchronous rectifier SR, that is, the actual turn-on instant for the primary main transistor switch Q1 is not earlier than the actual turn-off instant K2 for the secondary synchronous rectifier SR.

In some embodiments, the primary turn-on signal PSC may be an electrical level signal, which provides an indication to turn on the primary main transistor switch Q1, for example, by its rising edge.

In this way, in addition to independently determining the actual turn-off instant K2 for the secondary synchronous rectifier SR without needing to detect whether the primary main transistor switch Q1 is turned on or not, the control circuit 101 can also subsequently take the actual turn-off instant K2 for the secondary synchronous rectifier SR as a basis for determining the actual turn-on instant for the primary main transistor switch Q1, thereby achieving the purpose of avoiding shoot-through without delaying the primary turn-on signal PSC. When there is no risk of shoot-through, for example, during DCM or CCM operation of the isolated power supply, a control feedback loop in the control circuit 101 for the primary main transistor switch Q1 may perform feedback control computation to choose the expected turn-on instant K1 to determine the actual turn-on instant for the primary main transistor switch Q1 without any additional delaying processing. As a result, feedback response or circuit performance will not be affected by any anti-shoot-through design. Further, when there is a risk of shoot-through, for example, due to a sudden load jump that may take place in CCM operation of the isolated power supply, the primary main transistor switch Q1 may be turned on after secondary synchronous rectifier SR is turned off only when such a risk of shoot-through has been confirmed. This eliminates the possibility of shoot-through, and only exerts a limited impact on the feedback response performance because the control circuit 101 only precisely intervenes and modifies the actual turn-on instant for the primary main transistor switch Q1 only in some periods found to be with a high risk of shoot-through.

Additionally, the isolated power supply system 100 further includes a primary controller 108 and a signal sensor 106.

The primary controller 108 is arranged on the primary side and configured to receive the primary turn-on signal PSC to generate a primary control signal PSG based on the information about the actual turn-on instant for the primary main transistor switch Q1 contained in the primary turn-on signal PSC. The primary controller 108 may also determine an actual turn-off instant for the primary main transistor switch Q1 based on a suitable feedback signal, such as a signal detecting a current flowing through the primary main transistor switch Q1, or a demagnetization signal detecting a drain of the primary main transistor switch Q1. Those of ordinary skill in the art may use an appropriate signal to determine the actual turn-off instant for the primary main transistor switch Q1 according to the requirements and feedback characteristics of practical applications, and the present disclosure is not limited in this regard.

The signal sensor 106 is configured to sense the output voltage VOUT of the isolated power supply to generate the voltage feedback signal VFB. In Embodiment 1, the signal sensor 106 may be a separate component which is independent of the control circuit 101. In other embodiments, the signal sensor 106 may be alternatively integrated with the control circuit 101 in a single die or chip. As well known to those skilled in the art, common examples of the signal sensor 106 may include a resistive voltage divider, and further description thereof is omitted herein.

Further, in Embodiment 1, the control circuit 101 may be entirely incorporated in the secondary side of the isolated power supply 100 and, as shown in FIG. 1, may additionally include a signal transmitter 105 configured to receive the primary turn-on signal PSC, modulate the received signal PSC and transmit the modulated signal from the secondary side to the primary side. Specifically, the signal transmitter 105 may employ any common technique for isolated communication between the primary and secondary sides, such as, optical coupling transmission, magnetic coupling transmission, capacitive coupling transmission or on-off keying (OOK) adopted to perform modulation to generate a pulse so as to transmit the primary turn-on signal PSC.

Figure 4A:
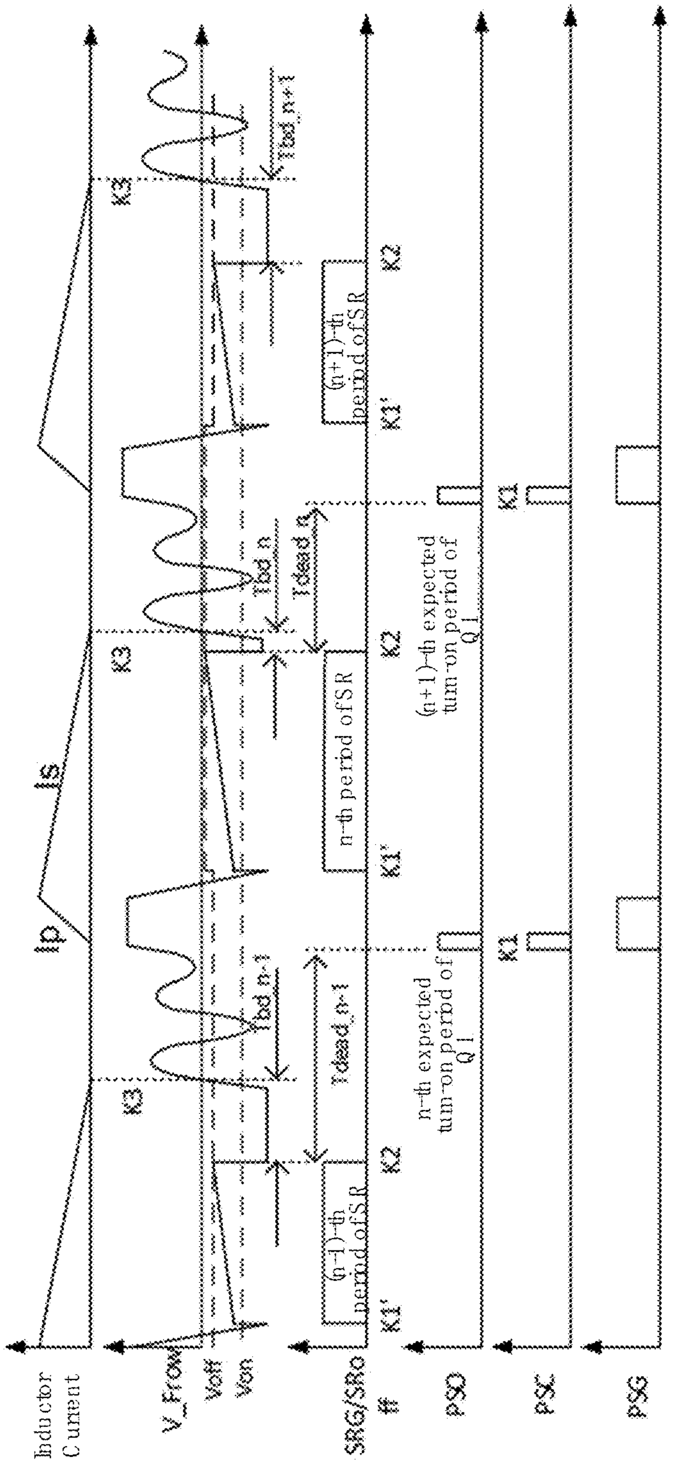
FIG. 4A is a waveform diagram of signals involved in DCM operation of the isolated power supply according to the first embodiment of the present disclosure.
Figure 4B:
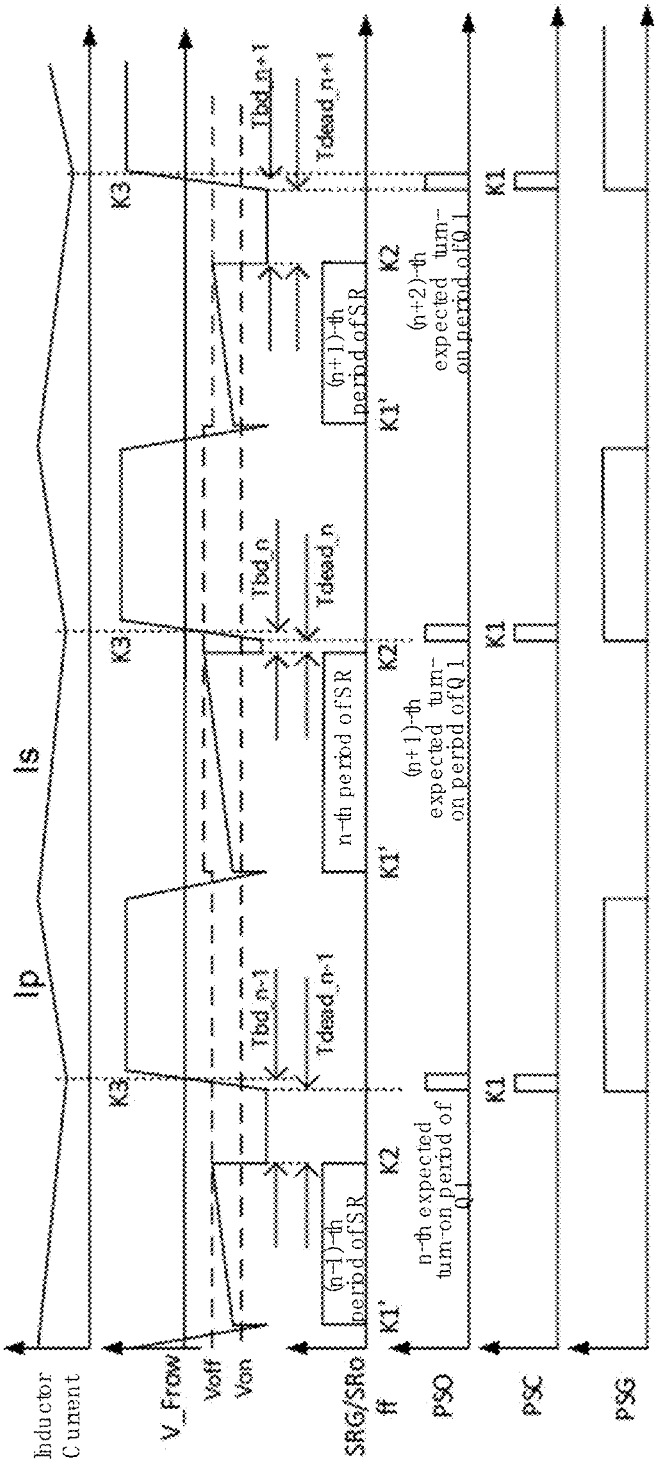
FIG. 4B is a waveform diagram of signals involved in CCM operation of the isolated power supply according to the first embodiment of the present disclosure.

FIGS. 4A and 4B are waveform diagrams of signals involved in DCM (FIG. 4A) and CCM (FIG. 4B) operation of the isolated power supply of FIG. 1. The working principles of the control circuit 101 will be described below with reference to FIGS. 1, 4A and 4B as an example. For ease of illustration, a primary current Ip and a secondary current Is are combined into a single waveform and are collectively referred to hereinafter as an "inductor current". Those skilled in the art will appreciate that, as for the illustrated embodiment, the term "inductor current" does not refer to a real-world current but the combined waveform of the primary current Ip and the secondary current Is. Moreover, for ease of explanation of the waveforms here and hereafter, it is presumed that a conduction time length of the secondary synchronous rectifier SR can vary in response to changes in the load 107.

As shown in FIGS. 4A and 4B, at the instant K1, the primary main transistor switch Q1 is turned on, raising the secondary voltage signal V_Frow to a positive level. At this point, the inductor current starts rising until the primary main transistor switch Q1 is turned off. Consequently, the secondary voltage signal V_Frow drops to a negative level, initiating a freewheeling phase of the secondary side. Since the secondary control signal generator 102 has received a rising edge of the primary original turn-on signal PSO (which indicates the expected turn-on instant K1 for the primary main transistor switch Q1), as soon as the secondary voltage signal V_Frow drops below the turn-on threshold Von for the first time (which indicates the expected turn-on instant for the secondary synchronous rectifier SR), the secondary control signal SRG transitions to high level at the instant K1', providing an indication to turn on the secondary synchronous rectifier SR. This timing scheme ensures that the secondary synchronous rectifier SR is turned on only after turn-on of the primary main transistor switch Q1 has occurred. Afterwards, the inductor current starts dropping, and before the next instant K1, the secondary synchronous rectifier SR will not be turned on again no matter whether the waveform of the secondary voltage signal V_Forw satisfies a predefined condition for turning on the secondary synchronous rectifier SR (e.g., the secondary voltage signal V_Frow again drops below the turn-on threshold Von). When the inductor current drops to such a level that the secondary voltage signal V_Frow rises above the turn-off threshold Voff_n for the current switching period (indicating that the demagnetization is about to be completed), the secondary control signal SRG transitions to a low level at the instant K2, providing an indication to turn off the secondary synchronous rectifier SR.

As shown in FIGS. 1 and 4A, in DCM operation, if the freewheeling time Tbd_n−1 for the (n−1)-th switching period is greater than the freewheeling reference value Tbd_min at the end of (n−1)-th switching period, the turn-off threshold Voff_n for the n-th switching period is increased to delay turn-off of the secondary synchronous rectifier SR in the n-th switching period. If the freewheeling time Tbd_n for the n-th switching period is less than the freewheeling reference value Tbd_min at the end of n-th switching period, the turn-off threshold Voff_n+1 for the (n+1)-th switching period is reduced to allow the secondary synchronous rectifier SR to be turned off at an earlier time in the (n+1)-th switching period to increase the freewheeling time Tbd_n+1 for the (n+1)-th switching period. Through choosing appropriate amounts of adjustment for the turn-off threshold Voff, the freewheeling time Tbd can be kept close to the freewheeling reference value Tbd_min in steady-state.

As shown in FIGS. 1 and 4B, in CCM operation, if the dead time Tdead_n−1 for the (n−1)-th switching period is greater than the dead reference value Tdead_min at the end of (n−1)-th switching period, the turn-off threshold Voff_n for the n-th switching period increased to delay turn-off of the secondary synchronous rectifier SR in the n-th switching period. If the dead time Tdead for the n-th switching period is less than the dead reference value Tdead_min at the end of n-th switching period, the turn-off threshold Voff_n+1 for the (n+1)-th switching period is reduced to allow the secondary synchronous rectifier SR to be turned off at an earlier time in the (n+1)-th switching period to increase the dead time Tdead_n+1 for the (n+1)-th switching period. Through choosing appropriate amounts of adjustment for the turn-off threshold Voff, the dead time Tdead can be kept close to the dead reference value Tdead_min in steady-state.

Based on the above, in the Embodiment 1, there is also provided a control method for an isolated power supply, which includes the steps as follows.

Step S100: receive a voltage feedback signal VFB of an output voltage VOUT of the isolated power supply 100 to generate a primary original turn-on signal PSO. The primary original turn-on signal PSO contains information about an expected turn-on instant K1 for a primary main transistor switch Q1 in the isolated power supply 100.

Step S200: receive a secondary voltage signal V_Forw from a secondary winding S1 in the isolated power supply 100 and the primary original turn-on signal PSO, obtain therefrom information about an expected turn-on instant for a secondary synchronous rectifier SR in the isolated power supply 100, a freewheeling time Tbd of a body diode in the secondary synchronous rectifier SR and a dead time Tdead, thereby generating a secondary control signal SRG.

In a current switching period, if the expected turn-on instant K1 for the primary main transistor switch Q1 is earlier than the expected turn-on instant for the secondary synchronous rectifier SR, the secondary control signal SRG may provide an indication to turn on the secondary synchronous rectifier SR. If a value of the secondary voltage signal V_Forw is higher than a turn-off threshold Voff_n for the current switching period, the secondary control signal SRG may provide an indication to turn off the secondary synchronous rectifier SR. Further, a secondary control signal generator 102 is used to adjust the turn-off threshold Voff_n+1 for the next switching period based on the freewheeling time Tbd_n and dead time Tdead_n for the current switching period to bring the freewheeling time and dead time closer to a freewheeling reference value Tbd_min and a dead reference value Tdead_min, respectively.

Furthermore, adjusting the turn-off threshold Voff_n+1 for the next switching period based on the freewheeling time Tbd_n and dead time Tdead_n for the current switching period may include the steps of:

- S201: comparing the freewheeling time Tbd_n for the current switching period with the freewheeling reference value Tbd_min and comparing the dead time Tdead_n for the current switching period with the dead reference value Tdead_min; and
- S202: if the freewheeling time Tbd_n for the current switching period is less than the freewheeling reference value Tbd_min or the dead time Tdead_n for the current switching period is less than the dead reference value Tdead_min, reducing the turn-off threshold Voff_n+1 for the next switching period; or if the freewheeling time Tbd_n for the current switching period is greater than the freewheeling reference value Tbd_min and the dead time Tdead_n for the current switching period is greater than the dead reference value Tdead_min, increasing the turn-off threshold Tdead_min for the next switching period.

Embodiment 2

Figure 5:
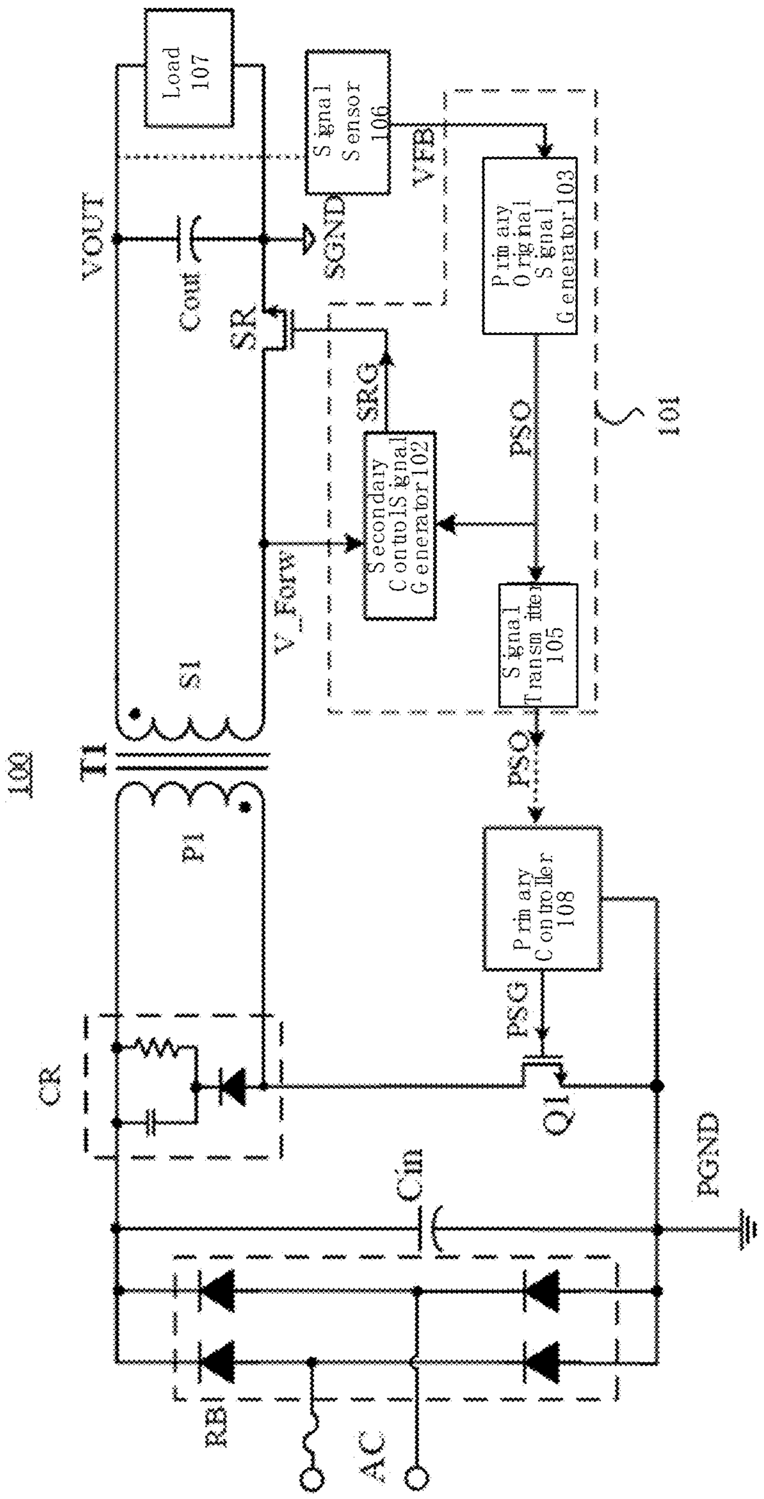
FIG. 5 is a schematic diagram showing the structure of an isolated power supply according to a second embodiment of the present disclosure.

FIG. 5 is a schematic diagram showing the structure of an isolated power supply 100 according to a second embodiment of the present disclosure. As shown in FIG. 5, Embodiment 2 differs from the Embodiment 1 in that the logic controller is omitted, with the signal transmitter 105 being configured to directly modulate the primary original turn-on signal PSO and transmit the modulated signal from the secondary side to the primary side. In this way, in a current switching period, the expected turn-on instant K1 corresponds to the actual turn-on instant for the primary main transistor switch Q1.

It is noted that the primary controller 108 may determine the actual turn-off instant for the primary main transistor switch Q1 and generate the primary control signal PSG based on a suitable feedback signal, such as a signal detecting a current flowing through the primary main transistor switch Q1, or a demagnetization signal detecting the drain of the primary main transistor switch Q1. Those of ordinary skill in the art may use an appropriate signal to determine the actual turn-off instant for the primary main transistor switch Q1 according to the requirements and feedback characteristics of practical applications, and the present disclosure is not limited in this regard.

In summary, embodiments of the present disclosure provide a control circuit of an isolated power supply, which includes a primary original signal generator and a secondary control signal generator. The primary original signal generator is configured to receive a voltage feedback signal of an output voltage of the isolated power supply to generate a primary original turn-on signal which contains information about an expected turn-on instant for a primary main transistor switch. The secondary control signal generator is configured to receive a secondary voltage signal from a secondary winding and the primary original turn-on signal to generate a secondary control signal. In a current switching period, only when the expected turn-on instant for the primary main transistor switch is earlier than an expected turn-on instant for a secondary synchronous rectifier, will the secondary control signal provide an indication to turn on the secondary synchronous rectifier, thereby overcoming the problem of possible false turn-on of the secondary synchronous rectifier SR in DCM operation and eliminating the possibility of shoot-through. Moreover, the secondary control signal generator is also configured to adjust a turn-off threshold for the next switching period based on freewheeling time and dead time of the current switching period so that the freewheeling time and the dead time get closer to a freewheeling reference value and a dead reference value, respectively. Further, only when a value of the secondary voltage signal is higher than the turn-off threshold for the current switching period, will the secondary control signal provide an indication to turn off the secondary synchronous rectifier. This enables the secondary synchronous rectifier to be turned off at an almost zero current in a steady-state, achieving reduced switching loss and higher efficiency. The present disclosure also provides a corresponding isolated power supply and a corresponding control method.

The embodiments disclosed herein are described in a progressive manner with the description of each embodiment focusing on its differences from others, and reference can be made between the embodiments for identical or similar features. Since the method embodiments correspond to the system embodiments, they are described relatively briefly, and reference can be made to the system embodiments for details of the method embodiments.

It is noted that while the disclosure has been described above with reference to preferred embodiments thereof, it is not limited to these embodiments. In light of the above teachings, any person familiar with the art may make many possible modifications and variations to the disclosed embodiments or adapt them into equivalent embodiments, without departing from the scope of the disclosure. Accordingly, it is intended that any and all simple variations, equivalent alternatives and modifications made to the foregoing embodiments based on the substantive disclosure of the disclosure without departing from the scope thereof fall within the scope.

It is understood that, as used herein, the terms "first", "second", "third" and the like are only meant to distinguish various components, elements, steps, etc. from each other rather than indicate logical or sequential orderings thereof, unless otherwise indicated or specified.

It is also recognized that the terminology used herein is for the purpose of describing particular embodiments only, and is not intended to limit the scope of the present disclosure. It must be noted that, as used herein and in the appended claims, the singular forms "a" and "an" include the plural reference unless the context clearly dictates otherwise. Thus, for example, a reference to "a step" or "a device" is a reference to one or more steps or devices and may include sub-steps and sub-devices. All conjunctions used are to be understood in the most inclusive sense possible. Thus, the term "or" should be understood as having the definition of a logical "or" rather than that of a logical "exclusive or" unless the context clearly necessitates otherwise. Further, implementation of the method and/or device according to the embodiments of the present disclosure may involve performing selected tasks manually, automatically, or a combination thereof.

The invention claimed is:

1. A control circuit of an isolated power supply, comprising:

a primary original signal generator configured to receive a voltage feedback signal of an output voltage of the isolated power supply to generate a primary original turn-on signal, wherein the primary original turn-on signal contains information about an expected turn-on instant for a primary main transistor switch in the isolated power supply; and a secondary control signal generator configured to receive a secondary voltage signal from a secondary winding in the isolated power supply and the primary original turn-on signal to obtain: information about an expected turn-on instant for a secondary synchronous rectifier in the isolated power supply; a freewheeling time of a body diode in the secondary synchronous rectifier; and a dead time, thereby generating a secondary control signal, wherein in a current switching period, if the expected turn-on instant for the primary main transistor switch is earlier than the expected turn-on instant for the secondary synchronous rectifier, the secondary control signal provides an indication to turn on the secondary synchronous rectifier; or if a value of the secondary voltage signal is higher than a turn-off threshold for the current switching period, the secondary control signal provides an indication to turn off the secondary synchronous rectifier, and wherein the secondary control signal generator further adjusts the turn-off threshold for a next switching period based on the freewheeling time and the dead time of the current switching period, so that the freewheeling time gets closer to a freewheeling reference value and the dead time gets closer to a dead reference value.

2. The control circuit of claim 1, wherein the secondary control signal generator further derives a secondary turn-off signal from the secondary control signal, wherein the secondary turn-off signal contains information about an actual turn-off instant for the secondary synchronous rectifier, and wherein the control circuit further comprises:

a logic controller configured to receive the primary original turn-on signal and the secondary turn-off signal to generate a primary turn-on signal, wherein the primary turn-on signal contains information about an actual turn-on instant for the primary main transistor switch and indicates that the actual turn-on instant for the primary main transistor switch is not earlier than the actual turn-off instant for the secondary synchronous rectifier in the current switching period.

3. The control circuit of claim 2, wherein in the current switching period, if the expected turn-on instant for the primary main transistor switch is later than the actual turn-off instant for the secondary synchronous rectifier, the primary turn-on signal provides an indication to turn on the primary main transistor switch at the expected turn-on instant for the primary main transistor switch; or wherein if the expected turn-on instant for the primary main transistor switch is earlier than the actual turn-off instant for the secondary synchronous rectifier, the primary turn-on signal provides an indication to turn on the primary main transistor switch at or after the actual turn-off instant for the secondary synchronous rectifier.

4. The control circuit of claim 2, further comprising:

a signal transmitter configured to receive and modulate the primary original turn-on signal or the primary turn-on signal, and to transmit the modulated primary original turn-on signal or the modulated primary turn-on signal from the secondary side to the primary side.

5. The control circuit of claim 1, wherein the expected turn-on instant for the secondary synchronous rectifier is an instant at which a value of the secondary voltage signal drops below a turn-on threshold for a first time; or wherein the expected turn-on instant for the secondary synchronous rectifier is an instant at which a slope of the secondary voltage signal rises above a turn-on slope threshold for a first time.

6. The control circuit of claim 1, wherein the secondary control signal generator comprises:

a time detector configured to receive the secondary voltage signal and the primary original turn-on signal, and to detect the freewheeling time and the dead time of the current switching period;

a threshold generator configured to receive the freewheeling time and the dead time of the current switching period, and to output the turn-off threshold for the next switching period based on: a comparison of the freewheeling time with the freewheeling reference value; and a comparison of the dead time with the dead reference value; and a control signal generator configured to receive the primary original turn-on signal, the secondary voltage signal and the turn-off threshold for the current switching period, thereby generating the secondary control signal.

7. The control circuit of claim 6, wherein if the freewheeling time of the current switching period is less than the freewheeling reference value or the dead time of the current switching period is less than the dead reference value, the turn-off threshold for the next switching period generated by the threshold generator is lower than the turn-off threshold for the current switching period; or wherein if the freewheeling time of the current switching period is greater than the freewheeling reference value and the dead time of the current switching period is greater than the dead reference value, the turn-off threshold for the next switching period generated by the threshold generator is higher than the turn-off threshold for the current switching period.

8. An isolated power supply, comprising:

an isolated converter comprising a primary side and a secondary side, wherein the primary side comprises a primary main transistor switch, and wherein the secondary side comprises a secondary synchronous rectifier; and a control circuit of an isolated power supply, wherein the control circuit comprises:

a primary original signal generator configured to receive a voltage feedback signal of an output voltage of the isolated power supply to generate a primary original turn-on signal, wherein the primary original turn-on signal contains information about an expected turn-on instant for the primary main transistor switch in the isolated power supply; and a secondary control signal generator configured to receive a secondary voltage signal from a secondary winding in the isolated power supply and the primary original turn-on signal to obtain: information about an expected turn-on instant for the secondary synchronous rectifier in the isolated power supply; a freewheeling time of a body diode in the secondary synchronous rectifier; and a dead time, thereby generating a secondary control signal, wherein in a current switching period, if the expected turn-on instant for the primary main transistor switch is earlier than the expected turn-on instant for the secondary synchronous rectifier, the secondary control signal provides an indication to turn on the secondary synchronous rectifier; or if a value of the secondary voltage signal is higher than a turn-off threshold for the current switching period, the secondary control signal provides an indication to turn off the secondary synchronous rectifier, wherein the secondary control signal generator further adjusts the turn-off threshold for a next switching period based on the freewheeling time and the dead time of the current switching period, so that the freewheeling time gets closer to a freewheeling reference value and the dead time gets closer to a dead reference value.

9. The isolated power supply of claim 8, wherein the isolated converter is a flyback isolated converter.

10. The isolated power supply of claim 8, wherein the control circuit is arranged on the secondary side, wherein the isolated power supply further comprises a primary controller arranged on the primary side, and wherein the primary controller is configured to receive a signal from the control circuit to control turn-on and turn-off of the primary main transistor switch.

11. The isolated power supply of claim 8, wherein the secondary control signal generator further derives a secondary turn-off signal from the secondary control signal, wherein the secondary turn-off signal contains information about an actual turn-off instant for the secondary synchronous rectifier, and wherein the control circuit further comprises:

a logic controller configured to receive the primary original turn-on signal and the secondary turn-off signal to generate a primary turn-on signal, wherein the primary turn-on signal contains information about an actual turn-on instant for the primary main transistor switch and indicates that the actual turn-on instant for the primary main transistor switch is not earlier than the actual turn-off instant for the secondary synchronous rectifier in the current switching period.

12. The isolated power supply of claim 11, wherein in the current switching period, if the expected turn-on instant for the primary main transistor switch is later than the actual turn-off instant for the secondary synchronous rectifier, the primary turn-on signal provides an indication to turn on the primary main transistor switch at the expected turn-on instant for the primary main transistor switch; or wherein if the expected turn-on instant for the primary main transistor switch is earlier than the actual turn-off instant for the secondary synchronous rectifier, the primary turn-on signal provides an indication to turn on the primary main transistor switch at or after the actual turn-off instant for the secondary synchronous rectifier.

13. The isolated power supply of claim 11, further comprising:

a signal transmitter configured to receive and modulate the primary original turn-on signal or the primary turn-on signal, and to transmit the modulated primary original turn-on signal or the modulated primary turn-on signal from the secondary side to the primary side.

14. The isolated power supply of claim 8, wherein the expected turn-on instant for the secondary synchronous rectifier is an instant at which a value of the secondary voltage signal drops below a turn-on threshold for a first time; or wherein the expected turn-on instant for the secondary synchronous rectifier is an instant at which a slope of the secondary voltage signal rises above a turn-on slope threshold for a first time.

15. The isolated power supply of claim 8, wherein the secondary control signal generator comprises:

a time detector configured to receive the secondary voltage signal and the primary original turn-on signal, and to detect the freewheeling time and the dead time of the current switching period;

a threshold generator configured to receive the freewheeling time and the dead time of the current switching period, and to output the turn-off threshold for the next switching period based on: a comparison of the freewheeling time with the freewheeling reference value; and a comparison of the dead time with the dead reference value; and a control signal generator configured to receive the primary original turn-on signal, the secondary voltage signal and the turn-off threshold for the current switching period, thereby generating the secondary control signal.

16. The isolated power supply of claim 15, wherein if the freewheeling time of the current switching period is less than the freewheeling reference value or the dead time of the current switching period is less than the dead reference value, the turn-off threshold for the next switching period generated by the threshold generator is lower than the turn-off threshold for the current switching period; or wherein if the freewheeling time of the current switching period is greater than the freewheeling reference value and the dead time of the current switching period is greater than the dead reference value, the turn-off threshold for the next switching period generated by the threshold generator is higher than the turn-off threshold for the current switching period.

17. A control method for an isolated power supply, comprising:

receiving a voltage feedback signal of an output voltage of the isolated power supply to generate a primary original turn-on signal, wherein the primary original turn-on signal contains information about an expected turn-on instant for a primary main transistor switch in the isolated power supply; and receiving a secondary voltage signal from a secondary winding in the isolated power supply and the primary original turn-on signal to obtain: information about an expected turn-on instant for a secondary synchronous rectifier in the isolated power supply; a freewheeling time of a body diode in the secondary synchronous rectifier; and a dead time, thereby generating a secondary control signal, wherein in a current switching period, if the expected turn-on instant for the primary main transistor switch is earlier than the expected turn-on instant for the secondary synchronous rectifier, the secondary control signal provides an indication to turn on the secondary synchronous rectifier; or if a value of the secondary voltage signal is higher than a turn-off threshold for the current switching period, the secondary control signal provides an indication to turn off the secondary synchronous rectifier, and wherein the turn-off threshold for a next switching period is adjusted by a secondary control signal generator based on the freewheeling time and the dead time of the current switching period, so that the freewheeling time gets closer to a freewheeling reference value and the dead time gets closer to a dead reference value.

18. The control method of claim 17, wherein the adjustment of the turn-off threshold for the next switching period based on the freewheeling time and the dead time of the current switching period comprises the steps of:

comparing the freewheeling time of the current switching period with the freewheeling reference value, and comparing the dead time of the current switching period with the dead reference value; and wherein if the freewheeling time of the current switching period is less than the freewheeling reference value or the dead time of the current switching period is less than the dead reference value, reducing the turn-off threshold for the next switching period, or wherein if the freewheeling time of the current switching period is greater than the freewheeling reference value and the dead time of the current switching period is greater than the dead reference value, increasing the turn-off threshold for the next switching period.

* * * * *